A. C. GRANT.
AUTO WHEEL.
APPLICATION FILED MAY 10, 1918.
1,298,332. Patented Mar. 25, 1919.
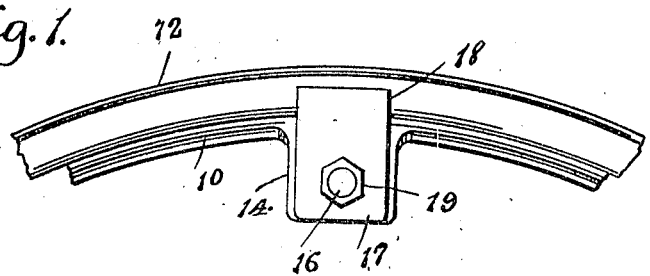
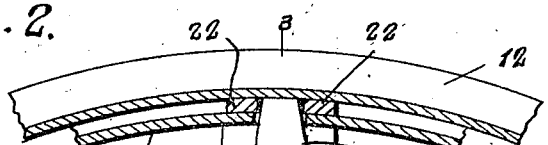
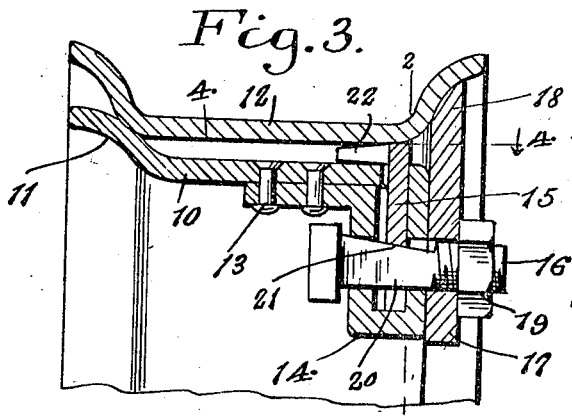
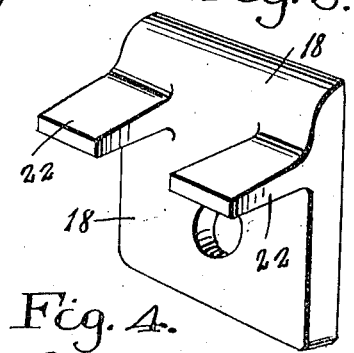
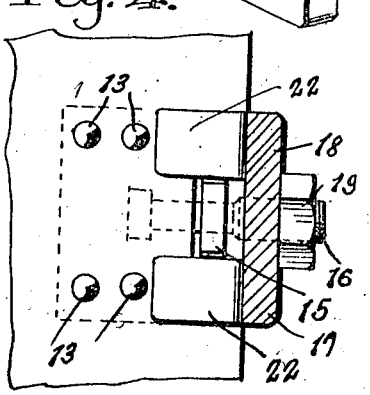
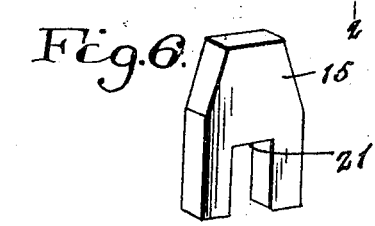
Inventor
A. C. Grant.
By [signature] Attorney

UNITED STATES PATENT OFFICE.

ALBERT C. GRANT, OF CHICAGO, ILLINOIS, ASSIGNOR TO GRANT WIRE WHEEL MANUFACTURING COMPANY, A CORPORATION OF DELAWARE.

AUTO-WHEEL.

1,298,332. Specification of Letters Patent. Patented Mar. 25, 1919.

Application filed May 10, 1918. Serial No. 233,722.

*To all whom it may concern:*

Be it known that I, ALBERT C. GRANT, a citizen of the United States, residing at Chicago, in the county of Cook and State of Illinois, have invented certain new and useful Improvements in Auto-Wheels; and I do hereby declare the following to be a full, clear, and exact description of the invention, such as will enable others skilled in the art to which it appertains to make and use the same.

The object of the invention is to provide a simple, inexpensive and efficient demountable rim and means for locking the same in its operative position with reference to the body portion of the wheel, the parts being so constructed and related as to facilitate the dismounting and mounting of the rim while insuring the firm seating of the demountable rim to resist shocks and jars, vibration and the like, incident to the use thereof.

Further objects will appear hereinafter, it being understood that changes in the form, proportion and details of construction and arrangement may be resorted to within the scope of the appended claims without departing from the spirit of the invention.

In the drawing:

Figure 1 is a side view of a portion of a wheel provided with a demountable rim and securing means constructed in accordance with the invention.

Fig. 2 is a sectional view taken longitudinally of the rim on the plane indicated by line 2—2 of Fig. 3.

Fig. 3 is a transverse sectional view of the rim construction on the plane indicated by the line 3—3 of Fig. 2.

Fig. 4 is a transverse sectional view taken on the plane indicated by the line 4—4 of Fig. 3.

Fig. 5 is a detail view in perspective of the clamp plate.

Fig. 6 is a similar view of the slide.

Fig. 7 is a similar view of the adjusting bolt.

In the illustrated embodiment of the invention, the main wheel rim 10 is provided at one edge with a seating flange 11 upon which is seated one edge of the demountable rim 12. A plurality of securing means are mounted on the other edges of said rim and each includes a bracket 14 secured by rivets 13, forming a seat or housing for a radially movable slide 15. Also carried by the main rim and secured to the bracket 14 thereof as by a bolt 16, is a clamp plate 17 which, at its outer extremity as shown at 18, is adapted to bear against the outer surface of the demountable rim. This bolt 16, which is provided with an adjusting nut 19 to bear against the outer surface of the clamp plate, is also provided with a wedge portion 20 engaging a seat 21 in the slide 15, whereby as the bolt is adjusted by tightening the nut 19, the slide is forced outward radially and its extremity bearing against the inner surface of the demountable rim, serves to lock the latter firmly in place. The clamp plate preferably is provided with inwardly extending spacing fingers 22 which pass upon either side of or straddle the outer end of the slide, and fit between the adjacent surfaces of the main and demountable rims. Said fingers thus serve not only the function of spacing elements but of guiding means for the outer end of the slide in the adjustment of the latter by means of the wedge 20, and obviously when the bolt is tightened the locking effect of the said spacing fingers and slide plate is supplemented by the contact of the outer extremity of the clamp plate with the flange of the demountable rim, serving to press the latter firmly into seating contact with the flange 11.

It will be obvious moreover, in view of the foregoing, that the parts are adapted for adjustment to compensate for any wear of the contacting faces thereof, and insure an effective relation of the parts for a protracted period. In order to remove the demountable rim it is simply necessary to loosen the nuts with which the adjusting bolts are provided, whereupon the clamp plates will swing to a position out of engagement with the flange of the demountable rim, the slide dropping out of contact with the same. Moreover, it will be understood from the foregoing description that either of the elements set forth as combining to form the locking means for the demountable rim, may be replaced in the event of injury at a relatively small cost.

Having described the invention, I claim:

1. A rim securing means comprising a clamp plate carried by a main rim for terminal engagement with the outer edge of a demountable rim, spacing fingers carried by said clamp plate for interposition between the main and demountable rims, a radially movable slide carried by the main rim for terminal engagement with the inner surface of the demountable rim and disposed at its outer extremity between said spacing fingers, and wedging means for adjusting the slide relative to the main rim.

2. A rim securing means comprising a bracket carried by a main rim, a radially movable slide mounted upon said bracket for terminal engagement with the inner surface of a demountable rim, a clamp plate secured to said bracket and having terminal engagement with the outer edge of the demountable rim, said clamp plate being provided with spacing fingers straddling the outer end of the slide and fitting between the adjacent surfaces of the main and demountable rims, and a bolt securing the clamp plate to said bracket and provided with a wedge portion for moving the slide outwardly into terminal contact with the demountable rim.

3. A rim securing means comprising a slide mounted in a guide on a main rim and adapted for terminal contact with the inner surface of a demountable rim, a clamp plate for terminal engagement with the outer edge of the demountable rim and provided with spacing fingers straddling the slide and fitting between the rims, and a bolt for securing the clamp plate to the main rim, said bolt being provided with an intermediate wedge portion, and the slide being provided with a seat for engagement by the wedge portion of the bolt, whereby in the adjustment of the bolt the slide is moved radially to force its outer extremity into contact with the demountable rim.

In testimony whereof I affix my signature in presence of two witnesses.

ALBERT C. GRANT.

Witnesses:
  M. T. WINGFIELD,
  I. M. C. HEATH.